(12) United States Patent
Hubbard

(10) Patent No.: US 9,102,274 B2
(45) Date of Patent: *Aug. 11, 2015

(54) RESILIENT INFILL

(71) Applicant: Hubco Automotive Ltd., Wellington (NZ)

(72) Inventor: Peter Douglas Hubbard, Christchurch (NZ)

(73) Assignee: Hubco Automotive Limited, Wellington (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,560

(22) Filed: Sep. 30, 2013

(65) Prior Publication Data

US 2014/0166709 A1 Jun. 19, 2014

Related U.S. Application Data

(63) Continuation of application No. 12/679,431, filed as application No. PCT/NZ2008/000235 on Sep. 15, 2008, now Pat. No. 8,544,707.

(30) Foreign Application Priority Data

Sep. 21, 2007 (NZ) ........................................ 561809

(51) Int. Cl.
*B60R 9/05* (2006.01)
*B60R 9/04* (2006.01)
*B60R 9/052* (2006.01)

(52) U.S. Cl.
CPC .... *B60R 9/04* (2013.01); *B60R 9/05* (2013.01)

(58) Field of Classification Search
CPC .......... B60R 9/05; B60R 9/052; B60P 3/1008
USPC ......... 224/325, 309, 315, 316, 318, 326, 322; 296/180.1

See application file for complete search history.

(56) References Cited

U.S. PATENT DOCUMENTS 3,606,432 A  9/1971 Honatzis
3,858,774 A  1/1975 Friis
(Continued)

FOREIGN PATENT DOCUMENTS

AU  2006100386 A4  4/2006
AU  2006100386 A4 *  6/2006
(Continued)

OTHER PUBLICATIONS

Australian Receiving Office of WIPO, International Search Report and Written Opinion of the International Searching Authority relating to PCT Application No. PCT/NZ2008/000235, Jan. 7, 2009, 7 pages.
(Continued)

*Primary Examiner* — J. Gregory Pickett
*Assistant Examiner* — Todd Anderson
(74) *Attorney, Agent, or Firm* — Kolisch Hartwell, P.C.

(57) ABSTRACT

The invention relates to a resilient infill for positioning in a channel in a crossbar of a roof rack or load carrier. The infill comprises a flexible upper portion and a base comprising a bottom. A pair of flexible, opposing side walls extend from the bottom and curve upwardly and outwardly to meet with outer edges of the flexible upper portion. The width of the upper portion is greater than the width of the bottom and the infill has a substantially hollow interior. The infill is compressible and makes minimal wind noise when positioned in the crossbar of a roof rack located on a moving vehicle.

19 Claims, 5 Drawing Sheets

(56) References Cited

U.S. PATENT DOCUMENTS

| | | | |
|---|---|---|---|
| 4,245,764 A | 1/1981 | Kowalski et al. |
| 4,264,025 A | 4/1981 | Ferguson et al. |
| 4,274,570 A | 6/1981 | Bott |
| 4,277,009 A | 7/1981 | Bott |
| 4,448,337 A | 5/1984 | Cronce |
| 4,449,656 A | 5/1984 | Wouden |
| 4,487,348 A | 12/1984 | Mareydt |
| 4,586,638 A | 5/1986 | Prescott et al. |
| 4,588,117 A | 5/1986 | Bott |
| 4,684,049 A | 8/1987 | Maby et al. |
| 4,702,398 A | 10/1987 | Seager |
| D294,340 S | 2/1988 | Robson |
| 4,757,929 A | 7/1988 | Nelson |
| 4,778,092 A | 10/1988 | Grace |
| 4,789,145 A | 12/1988 | Wenrich |
| 4,877,169 A | 10/1989 | Grim |
| 4,993,615 A | 2/1991 | Arvidsson |
| 4,995,538 A | 2/1991 | Marengo |
| 5,025,967 A | 6/1991 | Cronce et al. |
| 5,201,487 A | 4/1993 | Epplett |
| 5,203,483 A | 4/1993 | Cucheran |
| 5,205,453 A | 4/1993 | Pudney et al. |
| 5,207,365 A | 5/1993 | Bott |
| 5,226,634 A | 7/1993 | Rudy, Jr. et al. |
| 5,282,560 A | 2/1994 | Ozog |
| 5,282,562 A | 2/1994 | Legault |
| 5,294,033 A | 3/1994 | Duemmler |
| 5,314,104 A | 5/1994 | Lee |
| 5,456,512 A | 10/1995 | Gibbs et al. |
| 5,471,714 A | 12/1995 | Olson |
| 5,492,258 A | 2/1996 | Brunner |
| 5,553,761 A | 9/1996 | Audoire et al. |
| 5,826,765 A | 10/1998 | Rak et al. |
| 5,924,614 A | 7/1999 | Kuntze et al. |
| 6,010,048 A | 1/2000 | Settelmayer |
| 6,062,450 A | 5/2000 | Noel et al. |
| 6,102,265 A | 8/2000 | Stapleton |
| 6,176,404 B1 | 1/2001 | Fourel |
| 6,182,876 B1 | 2/2001 | Moliner |
| 6,273,311 B1 | 8/2001 | Pedrini |
| 6,276,747 B1 | 8/2001 | Ogawa et al. |
| 6,279,802 B1 | 8/2001 | Hickman et al. |
| 6,557,931 B1 | 5/2003 | Tremmel et al. |
| 6,662,982 B1 | 12/2003 | Päkkilä |
| 6,722,541 B1 | 4/2004 | Aftanas et al. |
| 6,779,696 B2 | 8/2004 | Aftanas et al. |
| 6,796,471 B2 | 9/2004 | Aftanas et al. |
| 6,817,500 B2 | 11/2004 | Neaux |
| 6,845,893 B2 | 1/2005 | Nelson |
| 6,845,922 B2 | 1/2005 | Stark |
| 6,905,053 B2 | 6/2005 | Allen |
| 6,997,657 B1 | 2/2006 | Saward |
| 7,182,233 B1 | 2/2007 | Graffy et al. |
| 7,201,436 B2 | 4/2007 | Ludwig et al. |
| 7,328,824 B2 | 2/2008 | Smith et al. |
| 7,641,249 B2 | 1/2010 | Jung |
| 7,721,925 B1 | 5/2010 | Graffy et al. |
| 7,757,914 B2 | 7/2010 | Book et al. |
| 8,087,557 B2 | 1/2012 | Larsson et al. |
| 8,104,651 B2 | 1/2012 | Bingham |
| 8,333,311 B2 | 12/2012 | Hubbard |
| 8,393,508 B2 | 3/2013 | Sautter et al. |
| 8,544,707 B2 * | 10/2013 | Hubbard .................. 224/316 |
| 8,925,775 B2 * | 1/2015 | Sautter et al. ............. 224/322 |
| 2001/0013528 A1 | 8/2001 | Chimenti et al. |
| 2003/0178457 A1 | 9/2003 | Wang |
| 2004/0118886 A1 | 6/2004 | Mirshafiee et al. |
| 2004/0211801 A1 | 10/2004 | Barbara |
| 2005/0029320 A1 | 2/2005 | Chimenti et al. |
| 2006/0049324 A1 | 3/2006 | Smith et al. |
| 2006/0208022 A1 | 9/2006 | Karlsson |
| 2006/0273123 A1 | 12/2006 | Settelmayer |
| 2007/0108243 A1 | 5/2007 | Bingham |
| 2008/0257924 A1 | 10/2008 | Kmita et al. |
| 2009/0159624 A1 | 6/2009 | Johnson et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2013/0062379 A1 | 3/2013 | Sautter et al. |
| 2013/0200121 A1 | 8/2013 | Hubbard |
| 2013/0284779 A1 | 10/2013 | Sautter et al. |
| 2014/0028007 A1 | 1/2014 | Pfeiffer et al. |

FOREIGN PATENT DOCUMENTS

| | | |
|---|---|---|
| CN | 87104266 A1 | 3/1988 |
| CN | 101559737 A | 10/2009 |
| CN | 101559738 A | 10/2009 |
| CN | 101868375 A | 10/2010 |
| CN | 101868376 A | 10/2010 |
| CN | 102177047 A | 9/2011 |
| CN | 101861257 B | 11/2012 |
| DE | 3209912 A1 | 10/1983 |
| DE | 3637856 A1 | 5/1988 |
| DE | 202005007566 U1 | 7/2005 |
| EP | 0151907 A2 | 8/1985 |
| EP | 0646074 B1 | 10/1996 |
| EP | 0398885 B2 | 6/1997 |
| EP | 0945307 A2 | 9/1999 |
| EP | 1205358 A1 | 5/2002 |
| EP | 1340652 A1 | 9/2003 |
| EP | 1712420 A1 | 10/2006 |
| EP | 2200869 B1 | 4/2014 |
| FR | 2632595 A1 | 12/1989 |
| GB | 1045619 A | 10/1966 |
| GB | 1311367 A | 3/1973 |
| GB | 2277309 A | 10/1994 |
| GB | 2303344 A | 2/1997 |
| JP | 10250488 A | 9/1998 |
| WO | 9110581 A1 | 7/1991 |
| WO | 9954168 A1 | 10/1999 |
| WO | 2009038479 A1 | 3/2009 |
| WO | 2009038480 A1 | 3/2009 |
| WO | 2009041828 A1 | 4/2009 |
| WO | 2010030198 A1 | 3/2010 |
| WO | 2011084075 A1 | 7/2011 |
| WO | 2014022435 A1 | 2/2014 |

OTHER PUBLICATIONS

The Internatioanl Bureau of WIPO, International Preliminary Report on Patentability regarding PCT Patent Application No. PCT/NZ2008/000235, Jul. 28, 2009, 7 pages.

European Patent Office, Extended European Search Report regarding European Patent Application No. 08831383.8, Oct. 19, 2011, 4 pages.

U.S. Patent and Trademark Office, Office Action regarding U.S. Appl. No. 12/679,431, Jul. 5, 2012, 9 pages.

U.S. Patent and Trademark Office, Office Action regarding U.S. Appl. No. 12/679,431, Mar. 28, 2013, 10 pages.

The International Bureau of WIPO, International Search Report and Written Opinion of the International Searching Authority relating to PCT Application No. PCT/US13/52785, Jan. 7, 2014, 15 pages.

U.S. Patent and Trademark Office, Office Action regarding U.S. Appl. No. 13/954,897, Apr. 24, 2014, 10 pages.

State Intellectual Property Office of People's Rebublic of China, Office action regarding Chinese Patent Application No. 201210364793.6, dated Jun. 30, 2014, 14 pages.

* cited by examiner

RESILIENT INFILL

CROSS-REFERENCE TO RELATED APPLICATION

This is a continuation of U.S. patent application Ser. No. 12/679,431 filed Aug. 13, 2010 which application is a §371 U.S. national phase filing from Application No. PCT/NZ2008/000235 filed Sep. 15, 2008 which claims priority to New Zealand Application No. NZ561809 filed Sep. 21, 2007. The complete disclosures of which are hereby incorporated by reference for all purposes in their entireties.

FIELD OF THE INVENTION

The present invention relates to a vehicle roof rack or load carrier, and particularly relates to a resilient infill for a roof rack crossbar and a roof rack crossbar comprising such a resilient infill.

BACKGROUND OF THE INVENTION

Roof racks are well known and are manufactured in a variety of configurations. Typically, roof racks include a crossbar with a leg at each end of the crossbar, the legs being used to support the crossbar and attach the crossbar to the roof of a vehicle. The legs are spaced apart from each other a selected distance. Generally, the distance between the legs is determined by the width of the vehicle to which the roof rack is to be mounted.

A load or item may be attached to the crossbar. In one known arrangement, the crossbar of the roof rack includes a channel, which extends along the length of the crossbar. The peripheral surfaces of the channel are defined by a floor having two opposing side walls and a partial ceiling defined by two opposing lips with an opening in between. The opening in the channel allows one or more equipment brackets to be mounted to the crossbar to attach one or more items to the roof rack.

However, in this arrangement, the opening between the lips of the channel creates an exposed channel in the crossbar. The exposed channel creates wind turbulence, and hence wind noise, when the vehicle is travelling. This is generally overcome by placing a compressible resilient infill within the channel. The infill is generally hollow to assist its compressibility. The infill has a shape that substantially corresponds with the interior shape of the channel so that the infill slidingly engages with the peripheral surfaces of the channel.

In one example, as disclosed in WO 99/54168, the infill has a cross-sectional shape of a hollow inverted "T". The upper portion of the infill extends through the opening between the lips of the channel and substantially conforms with the upper surface of the crossbar.

Mounting brackets can be attached to the crossbar by positioning the attachment foot of the bracket between the infill and the lips of the channel.

Resilient infills for crossbars are typically made of flexible material such that the infill can be locally compressed to allow for mounting brackets to be attached to the crossbar, whilst still retaining the same uniform external shape over the rest of the length of the infill. However, a disadvantage of known infills is that the infills can be difficult to compress. As such, it can be difficult to attach a mounting bracket between the infill and the lips of the channel. Furthermore, the step between the upper surface of the infill and the upper surface of the crossbar creates an airtrap that causes wind noise when a vehicle, carrying a roofrack with infill, is moving.

It is an object of the present invention to go at least some way towards overcoming the above-mentioned disadvantages, or to at least provide the public with a useful choice.

SUMMARY OF THE INVENTION

In one aspect, the present invention provides a resilient infill for positioning in a channel in a crossbar of a roof rack or load carrier, wherein the infill comprises: a flexible upper portion; and a base comprising: a bottom; a pair of flexible opposing side walls extending from the bottom and curving upwardly and outwardly to meet with outer edges of the flexible upper portion; wherein the width of the upper portion is greater than the width of the bottom; and wherein the infill has a substantially hollow interior.

Preferably, the opposing curved side walls have an apex that is higher than the outer edges of the upper portion.

The resilient infill may be made from an extrusion of either rubber or plastic.

In a further aspect, the invention provides for a crossbar of a vehicle roof rack or load carrier, comprising a resilient infill according to the first aspect of the invention.

Preferably, the crossbar has an aerodynamic cross-sectional shape.

More preferably, the crossbar comprises a longitudinal channel having a longitudinal opening defined by opposing lips, the opposing lips having tapered inner surfaces. In this embodiment, the resilient infill is positioned within the channel. The infill has an upper surface corresponding with and contacting the tapered inner surfaces of the opposing lips.

In another preferred embodiment, the flexible upper portion has an upper surface with an at least partially exposed substantially flat region and wherein the substantially flat region of the infill is substantially flush with the upper surface of the crossbar.

In another preferred embodiment, the crossbar comprises an upper surface with a longitudinal channel therein having a longitudinal opening defined by opposing lips. Each lip has a curved edge with a tight radius of curvature. The infill touches the lips at or near the curved edges of the lips such that the upper surface of the crossbar and upper surface of the resilient infill are substantially flush with each other.

In another aspect, the invention provides a roof rack comprising a resilient infill according to the invention.

The term "roof rack" as used herein should be interpreted to include the similar term "load carrier".

Similarly, the term "crossbar" is to be interpreted broadly to include a roof rail or any load carrying apparatus configured to be releaseably clamped or attached to a roof rack leg.

The term "comprising" as used in this specification and claims should be interpreted to mean "consisting at least in part of or "comprising". That is, when interpreting independent claims comprising that term, the features prefaced by that term in each claim all need to be present but other features can also be present. Variants, such as "comprised" and "comprises" are to be interpreted in the same manner.

BRIEF DESCRIPTION OF THE DRAWINGS

Further aspects of the present invention will become apparent from the following description, which is given by way of example only and with reference to the accompanying drawings in which.

DETAILED DESCRIPTION OF PREFERRED EMBODIMENTS

Figure 1:
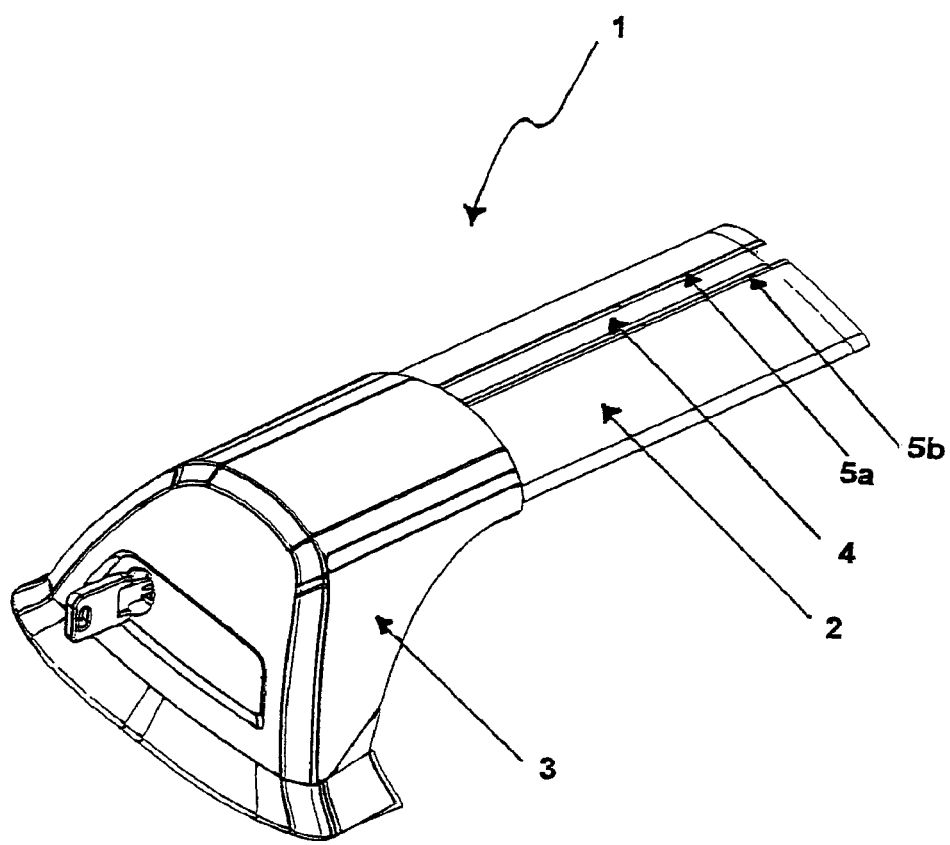
FIG. 1 is a perspective view of a section of a roof rack according to one embodiment of the present invention.

FIG. 1 shows a perspective view of a portion of a roof rack or load carrier 1 according to one embodiment of the present invention. The roof rack 1 comprises a crossbar 2 supported by a leg assembly 3, which attaches to and supports the crossbar above the roof of a vehicle.

Figure 2:
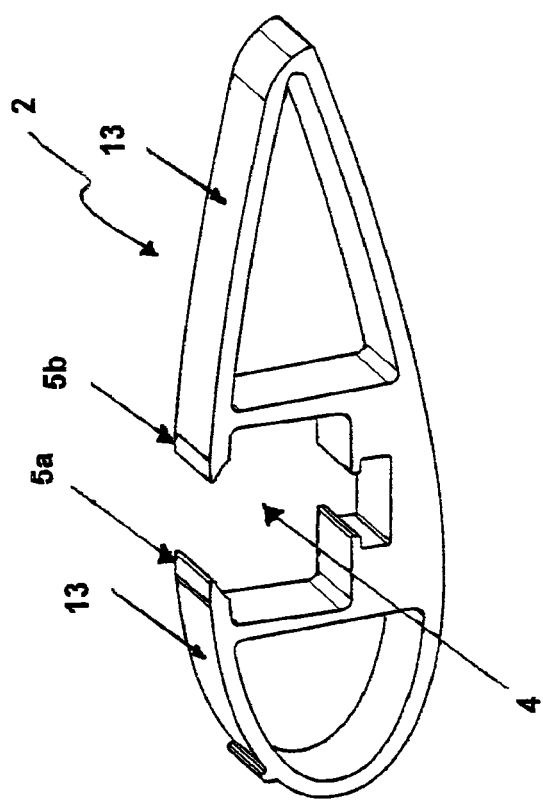
FIG. 2 is a perspective view of a portion of a crossbar for a roof rack according to one embodiment of the present invention.

Ideally, the crossbar has an aerodynamic cross-sectional shape, such as an aerofoil shape, as illustrated in FIG. 2. An aerodynamic cross-sectional shape aids in the efficiency of the crossbar as it moves through the air while the vehicle is moving, and also reduces wind noise resulting from air turbulence created by the crossbar 2.

The crossbar 2 comprises a longitudinal channel 4 having interior surfaces defined by a floor, or base portion, opposing side walls that extend from the floor, and a partial ceiling defined by longitudinal opposing lips 5a, 5b. The opposing lips 5a, 5b extend along the length of the crossbar 2 and define a longitudinal opening giving access to the channel 4 on the upper surface of the crossbar. The opposing lips 5a, 5b have tapered inner surfaces. Preferably, each of the lips 5a, 5b have a curved edge having a very small radius of curvature for reasons that will be described below. The edge of each lip 5a, 5b should be of the smallest radius possible without risking the edge being sharp and consequently damaging the infill, when fitted in the crossbar.

Special mounting brackets (not shown) can be attached to the crossbar 2 via the channel 4.

Figure 3:
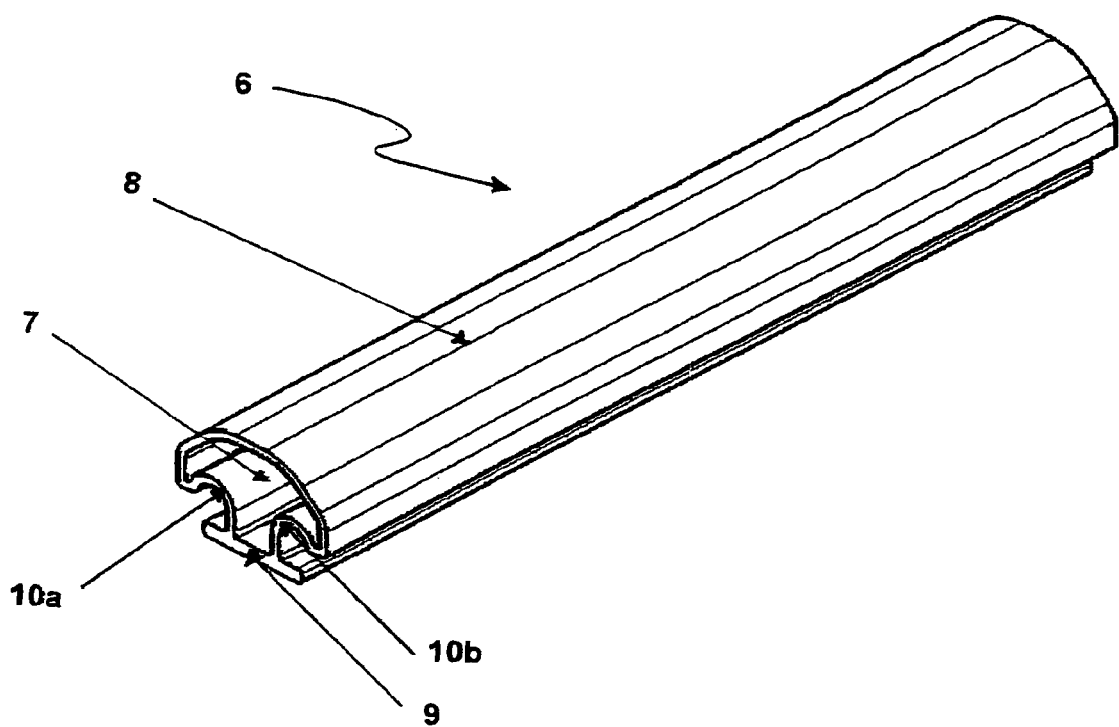
FIG. 3 is a perspective view of the resilient infill according to one embodiment of the present invention.
Figure 4:
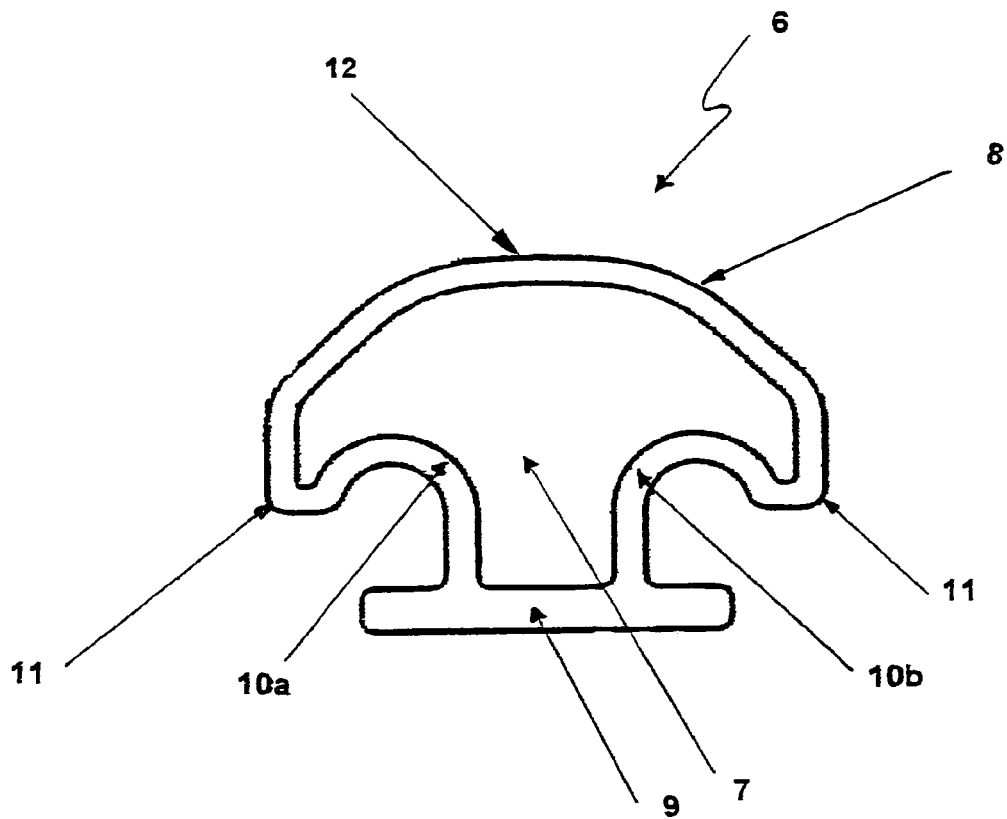
FIG. 4 is a cross-sectional view of the resilient infill of FIG. 3.

FIGS. 3 and 4 show a resilient infill 6, according to one embodiment of the present invention. The infill is adapted to be inserted into the channel 4 by sliding the infill into the channel, at one end of the crossbar.

The infill 6 has a hollow interior 7 and a flexible upper portion 8 having an external surface that is shaped to substantially correspond with the tapered inner surfaces of the opposing lips 5a, 5b. In the preferred form, the upper portion 8 has a substantially flat upper surface 12 with convex sides extending downwardly from the top to terminate at the lower edges 11 of the upper portion 8. Alternatively, the whole of the upper portion may be substantially curved.

Figure 5:
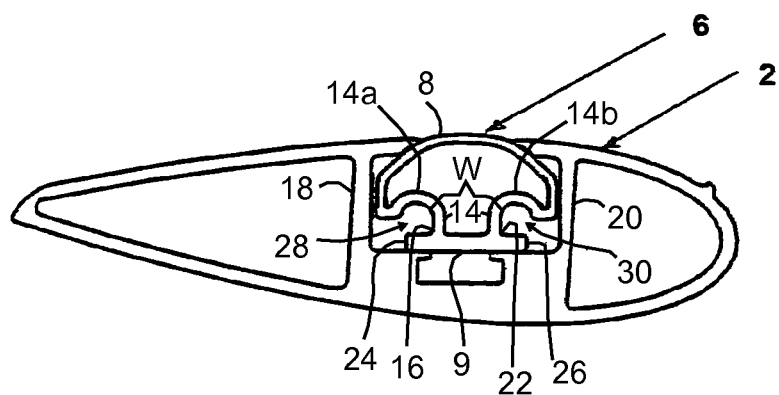
FIG. 5 is an end view of a crossbar containing a resilient infill according to one embodiment of the present invention.

Once the infill is inserted in the channel, a. portion of the infill 6 is exposed by the opening in the crossbar 2 between the opposing lips 5a, 5b, as shown in FIG. 5. The shape of the external surface of the upper portion 8 of the infill 6 and the small radius of the edges of the crossbar lips 5a, 5b, allows the exposed portion of the upper surface 12 of the infill 6 to be substantially flush with the upper surface 13 of the crossbar 2. This minimizes the step between the exposed upper surface of the infill 6 and the upper surface of the crossbar 2. Consequently, only a very small airtrap or cavity is formed between the upper surface of the infill and the upper surface of the crossbar. As such, the substantially flush upper surface of the crossbar and infill combination creates less wind noise (or cavity noise) than conventional crossbar and infill combinations.

In a preferred form of the invention, the curved edges of the crossbar lips 5a, 5b have such a tight radius of curvature, that the infill is able to touch the edges of the lips 5a, 5b only at or near the very top of the lips, thereby creating only a very small cavity between the infill 6 and the lips 5a, 5b.

The infill 6 also comprises a bottom 9 which is shaped to allow the infill to be seated on the base portion or floor of the channel 4 in the crossbar 2.

The upper portion 8 of the infill 4 is supported by a base that includes a bottom 9 that is connected to the upper portion 8 by a pair of opposing curved flexible outer walls 10a and 10b. The walls 10a and 10b extend upwardly from the bottom and substantially curve outwards from the bottom 9 to the lower outer edges 11 of the upper portion 8 of the infill 6. The curved outer walls may have an apex that is higher than the outer edges of the upper portion. In other words, the curved outer walls 10a and 10b curve back on themselves before joining with the outer edges 11 of the upper portion 8.

The outer edges 11 of the upper portion of the infill are higher than the bottom of the infill such that, when the infill is seated in the channel 4 of the crossbar, a compression space is provided between the outer edges 11 and the base portion or floor of the channel. In a preferred form, the width of the upper portion 8 is greater than the width of the bottom 9.

The infill 6 can be made from an extrusion of rubber or plastic.

In use, the infill 6 is positioned within the channel 4 in the crossbar 2, as shown in FIG. 5. The convex sides of the upper portion 8 of the infill 6 press against the tapered inner surfaces of the opposing lips 5a, 5b of the channel 4. The exposed portion of the top surface 12 of the infill is substantially flush with the upper surface 13 of the crossbar 2.

The positioning of the infill in the channel 4 causes the infill to substantially seal the opening in the crossbar caused by the channel 4. Therefore, the infill 6 provides the crossbar 2 with a substantially uniform upper surface. This prevents unwanted drag and wind noise when the vehicle is moving. The infill 6 is locally collapsible so that the infill can be depressed to allow a mounting bracket to be attached to the crossbar 2 via the channel 4.

The curved nature of the side walls 10a, 10b of the infill 6 allows the infill to collapse when downward pressure is applied to the upper portion 8. The compression space between the base portion of the channel 4 and the outer edges 11 of the upper portion 8 of the infill 6 allows the upper portion 8 to collapse downwardly and fill that space when downward force is applied to the infill. The flexible nature of the upper portion 8 allows the upper portion 8 to collapse into the hollow interior 7 of the infill 6.

The combined nature of the collapsible upper portion 8, the collapsible curved side walls 10a, 10b, and the compression space, means that the infill 6 is able to be compressed to a greater degree than conventional infills. This aspect of the present invention makes it is relatively easy to insert a mounting bracket into the channel 4.

Furthermore, the infill 6 of the present invention is resilient and is able to substantially return to its original shape after long periods of compression. The infill 6 will maintain the integrity of the external profile of the upper surface of the crossbar 2, even after a mounting bracket has been attached to the crossbar and then removed after a long period of time.

Finally, the arrangement of the infill 6 of the present invention with a crossbar having lips with edges of a very small radius, provides a crossbar and infill combination that creates minimal wind noise when a vehicle, bearing a roofrack with the crossbar and infill combination, is moving.

As shown in FIG. 5, upper portion 8 is connected to bottom (or base) 9 by a trunk 14 to form a hollow interior. Trunk 14 has a narrower horizontal width W than upper portion 8 and base 9. A first portion 14a of trunk 14 is connected to a central portion of base 9 at a first junction 16 proximal first side wall 18 and distal second side wall 20. A second portion 14b of trunk 14 is connected to the central portion of base 9 at a second junction 22 proximal second side wall 20 and distal first side wall 18. Base 9 includes a first foot 24 extending along the floor portion of the channel (or cavity) away from first junction 16 and toward first side wall 18. Base 9 includes a second foot 26 extending along the floor portion away from second junction 22 and toward second side wall 20.

Void spaces are disposed inside the cavity and outside the infill. First void space 28 is disposed between first trunk portion 14a and first foot 24. Second void space 30 is disposed between second trunk portion 14b and second foot 26.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the scope of the applicant's general inventive concept.

I claim:

1. A vehicle rack crossbar system comprising:
    a crossbar having a longitudinal opening to a cavity having first and second opposing side walls connected to a floor portion, the opening having a width defined between opposing lips, the floor portion being connected to the opposing lips by the first and second opposing side walls; and
    a resilient infill having an upper portion connected to a base by a trunk to form a hollow interior, the upper portion pressing upward on the opposing lips, the base being seated on the floor portion, the trunk having first and second walls projecting upward from the base being separated by a distance which is less than a width of the base defined in a direction perpendicular to a long axis of the crossbar;
    wherein a void space is disposed inside the cavity and outside the infill between the hollow interior and the base of the infill.

2. The system of claim 1, wherein the base includes first and second feet, a first portion of the void space being disposed between the hollow interior and the first foot, a second portion of the void space being disposed between the hollow interior and the second foot.

3. The system of claim 2, wherein the trunk includes a first trunk portion flaring outward from the base toward the first side wall, the trunk including a second trunk portion flaring outward from the base toward the second side wall, the first portion of the void space being disposed between the first trunk portion and the first foot, the second portion of the void space being disposed between the second trunk portion and the second foot.

4. A vehicle rack crossbar system comprising:
    a crossbar having a longitudinal opening to a cavity having first and second opposing side walls connected to a floor portion, the opening having a width defined between first and second opposing lips, the floor portion being connected to the first lip by the first side wall, the floor portion being connected to the second lip by the second side wall; and
    a resilient infill having an upper portion connected to a base by a trunk to form a hollow interior, the upper portion pressing upward on the first and second lips, the base being seated on the floor portion, the trunk having a narrower horizontal width than the upper portion, the trunk flaring outward from the base toward the first and second side walls such that a portion of the hollow interior of the infill is disposed directly vertically above a void space disposed inside the cavity but outside the infill.

5. The system of claim 4, wherein the void space is disposed vertically between the portion of the hollow interior and the floor portion.

6. The system of claim 4, wherein the void space is disposed vertically between the portion of the hollow interior and the base.

7. A vehicle rack crossbar system comprising:
    a crossbar having a longitudinal opening to a cavity having first and second opposing side walls connected to a floor portion, the opening having a width defined between first and second opposing lips, the floor portion being connected to the first lip by the first side wall, the floor portion being connected to the second lip by the second side wall; and
    a resilient infill having an upper portion connected to a base by a trunk to form a hollow interior, the upper portion pressing upward on the first and second lips, the base being a planar solid platform seated on the floor portion, a first portion of the trunk being connected to the base at a first junction proximal the first side wall and distal the second side wall, a second portion of the trunk being connected to the base at a second junction proximal the second side wall and distal the first side wall, the base including a first foot extending along the floor portion away from the first junction and toward the first side wall and a second foot extending along the floor portion away from the second junction and toward the second side wall.

8. The system of claim 7, wherein the first foot extends under the first portion of the trunk.

9. The system of claim 7, wherein a void space is disposed inside the cavity and outside of the infill between the first portion of the trunk and the first foot of the base.

10. The system of claim 9, wherein the void space is disposed between the hollow interior and the first foot.

11. A vehicle rack crossbar system comprising:
    a crossbar having a longitudinal opening to a cavity having first and second opposing side walls connected to a floor portion, the opening having a width defined between first and second opposing lips, the floor portion being connected to the first lip by the first side wall, the floor portion being connected to the second lip by the second side wall; and
    a resilient infill having an upper portion connected to a base by a trunk to form a hollow interior, the trunk having a narrower horizontal width that the upper portion, the upper portion pressing upward on the first and second lips, the base being seated on the floor portion, the hollow interior having a volume, the infill having an overall vertical height extending from the base to the upper portion;
    wherein a majority of the volume of the hollow interior is disposed above a horizontal plane that bisects the overall vertical height of the infill.

12. The system of claim 11, wherein the trunk flares outward from the base toward the first and second side walls to define a boundary of the hollow interior below the horizontal plane.

13. The system of claim 11, wherein a horizontal width of the trunk is greater near the horizontal plane than near the base.

14. The system of claim 11, wherein the trunk flares outward from a central portion of the base toward the first and second side walls to define a boundary of first and second void spaces disposed below the horizontal plane and inside of the cavity but outside of the infill.

15. The system of claim 14, wherein the first void space is disposed between the hollow interior and a first portion of the base.

16. The system of claim 15, wherein the second void space is disposed between the hollow interior and a second portion of the base opposite the first portion of the base.

17. A vehicle rack crossbar system comprising:

a crossbar having a longitudinal opening to a cavity having first and second opposing side walls connected to a floor portion, the opening having a width defined between first and second opposing lips, the floor portion being connected to the first lip by the first side wall, the floor portion being connected to the second lip by the second side wall; and a resilient infill having an upper portion connected to a planar solid base by a trunk to form a hollow interior, the base being seated on the floor portion, the upper portion pressing upward on the first and second lips, a first portion of the trunk being connected to the base at a first junction proximal the first side wall and distal the second side wall, a second portion of the trunk being connected to the base at a second junction proximal the second side wall and distal the first side wall, the base including a first foot extending along the floor portion away from the first junction and toward the first side wall and a second foot extending along the floor portion away from the second junction and toward the second side wall;

wherein a void space is disposed inside the cavity and outside the hollow interior of the infill, a portion of the trunk being disposed between the hollow interior of the infill and the void space along a vertical axis.

18. The system of claim 17, wherein the vertical axis is substantially normal to the floor portion of the cavity.

19. The system of claim 17, wherein the portion of the trunk is approximately centrally disposed between the first lip and the floor portion of the cavity.

* * * * *